(12) United States Patent
Sato

(10) Patent No.: US 7,080,635 B2
(45) Date of Patent: Jul. 25, 2006

(54) INTAKE AND EXHAUST DEVICE FOR MULTI-CYLINDER ENGINE

(75) Inventor: Masatoshi Sato, Aichi-ken (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 11/148,925

(22) Filed: Jun. 8, 2005

(65) Prior Publication Data
US 2005/0274366 A1    Dec. 15, 2005

(30) Foreign Application Priority Data
Jun. 11, 2004  (JP)  .............................. 2004-174355

(51) Int. Cl.
*F02B 47/04* (2006.01)
*F02B 47/08* (2006.01)
(52) U.S. Cl. ................................ 123/568.2; 123/568.12
(58) Field of Classification Search ............ 123/568.2, 123/568.12, 568.17, 568.11, 562, 563; 60/605.2
See application file for complete search history.

(56) References Cited

U.S. PATENT DOCUMENTS

| | | | | |
|---|---|---|---|---|
| 4,496,291 A | * | 1/1985 | Grimmer | ..................... 417/247 |
| 5,740,786 A | * | 4/1998 | Gartner | ................. 123/568.12 |
| 6,089,019 A | * | 7/2000 | Roby et al. | ................. 60/605.2 |
| 6,408,833 B1 | * | 6/2002 | Faletti | ..................... 123/568.17 |
| 6,422,222 B1 | * | 7/2002 | Arbeiter et al. | .......... 123/568.2 |
| 6,752,132 B1 | * | 6/2004 | Remmels et al. | ...... 123/568.11 |
| 6,910,469 B1 | * | 6/2005 | Renkonen | .................... 123/563 |
| 6,917,873 B1 | * | 7/2005 | Itoyama | ..................... 701/108 |
| 6,951,211 B1 | * | 10/2005 | Bryant | ..................... 123/559.1 |

FOREIGN PATENT DOCUMENTS

JP  09264202 A  * 10/1997
JP  09-303212    11/1997

* cited by examiner

*Primary Examiner*—Mahmoud Gimie
(74) *Attorney, Agent, or Firm*—Morgan & Finnegan, LLP

(57) ABSTRACT

An intake and exhaust device for a multi-cylinder engine includes: a first intake and exhaust system corresponding to a first cylinder group and having an exhaust passage and an intake passage; a second intake and exhaust system corresponding to a second cylinder group and having an exhaust passage and an intake passage; a communication passage through which the exhaust passage of the first intake and exhaust system and the exhaust passage of the second intake and exhaust system communicate with each other; an adjusting valve for opening and closing the communication passage; an EGR unit for causing exhaust gas to circulate between the exhaust passage and the intake passage of the first intake and exhaust system and between the exhaust passage and the intake passage of the second intake and exhaust system respectively; and a control unit for controlling opening and closing of the adjusting valve and circulation of exhaust gas by the EGR unit based on an operating condition of the engine.

11 Claims, 4 Drawing Sheets

INTAKE AND EXHAUST DEVICE FOR MULTI-CYLINDER ENGINE

BACKGROUND OF THE INVENTION

1. Field of the Invention

The present invention relates to an intake and exhaust device for a multi-cylinder engine, and more particularly to an intake and exhaust device for a multi-cylinder engine equipped with two intake and exhaust systems each having a turbocharger.

2. Description of the Related Art

In a V-type multi-cylinder engine, turbochargers are disposed corresponding to both banks respectively, and energy of exhaust gas discharged from cylinders in the respective banks is recovered by turbines of the turbochargers to drive a compressor, whereby compressed intake air is supplied to the cylinders. In a V-type multi-cylinder engine equipped with such turbo chargers, as disclosed in, for example, JP 2002-522687 A, exhaust passages of both banks are coupled to each other to balance pressures in both the turbochargers, and a coupling portion between the exhaust passages is further connected to an intake passage common to both the banks by an EGR passage, so that part of exhaust gas is caused to recirculate (EGR) to an intake system. An on/off state of EGR is controlled by opening and closing an EGR valve disposed in the EGR passage.

However, since the EGR valve is disposed in a coupling portion between the exhaust passages for both the banks and the EGR passage, the exhaust passages for both the banks communicate with each other when the EGR valve is open, namely, when EGR is on. In contrast, it is impossible to establish communication between the exhaust passages for both the banks when EGR is off. Thus, in a high-load high-revolution range where EGR is generally off so as to achieve enhancement of output performance, the exhaust passages for both the banks are shut off from each other, and a difference in revolution speed between both the turbochargers, which occurs as a result of a difference in pressure between the exhaust passages for both the banks, is not eliminated. If the difference is small, revolution speeds of both the turbochargers can be made close to their maximums, so that a high output can be generated. However, if the difference is large, the revolution speed of one of the turbochargers may be still lower than its maximum even when the revolution speed of the other turbocharger is close to its maximum. This causes a problem in that it is difficult to sufficiently enhance an output.

SUMMARY OF THE INVENTION

The present invention has been made to solve the conventional problem mentioned above. It is an object of the present invention to provide an intake and exhaust device for a multi-cylinder engine which makes it possible to sufficiently enhance an output in all ranges including a high-load high-revolution range.

An intake and exhaust device for a multi-cylinder engine having a first cylinder group and a second cylinder group according to the present invention includes: a first intake and exhaust system corresponding to the first cylinder group and having an exhaust passage and an intake passage; a second intake and exhaust system corresponding to the second cylinder group and having an exhaust passage and an intake passage; a communication passage through which the exhaust passage of the first intake and exhaust system and the exhaust passage of the second intake and exhaust system communicate with each other; an adjusting valve for opening and closing the communication passage; EGR means for causing exhaust gas to circulate between the exhaust passage and the intake passage of the first intake and exhaust system and between the exhaust passage and the intake passage of the second intake and exhaust system respectively; and control means for controlling opening and closing of the adjusting valve and circulation of exhaust gas by the EGR means based on an operating condition of the engine.

DETAILED DESCRIPTION OF THE PREFERRED EMBODIMENTS

Embodiments of the present invention will be described hereinafter with reference to the accompanying drawings.

First Embodiment

Figure 1:
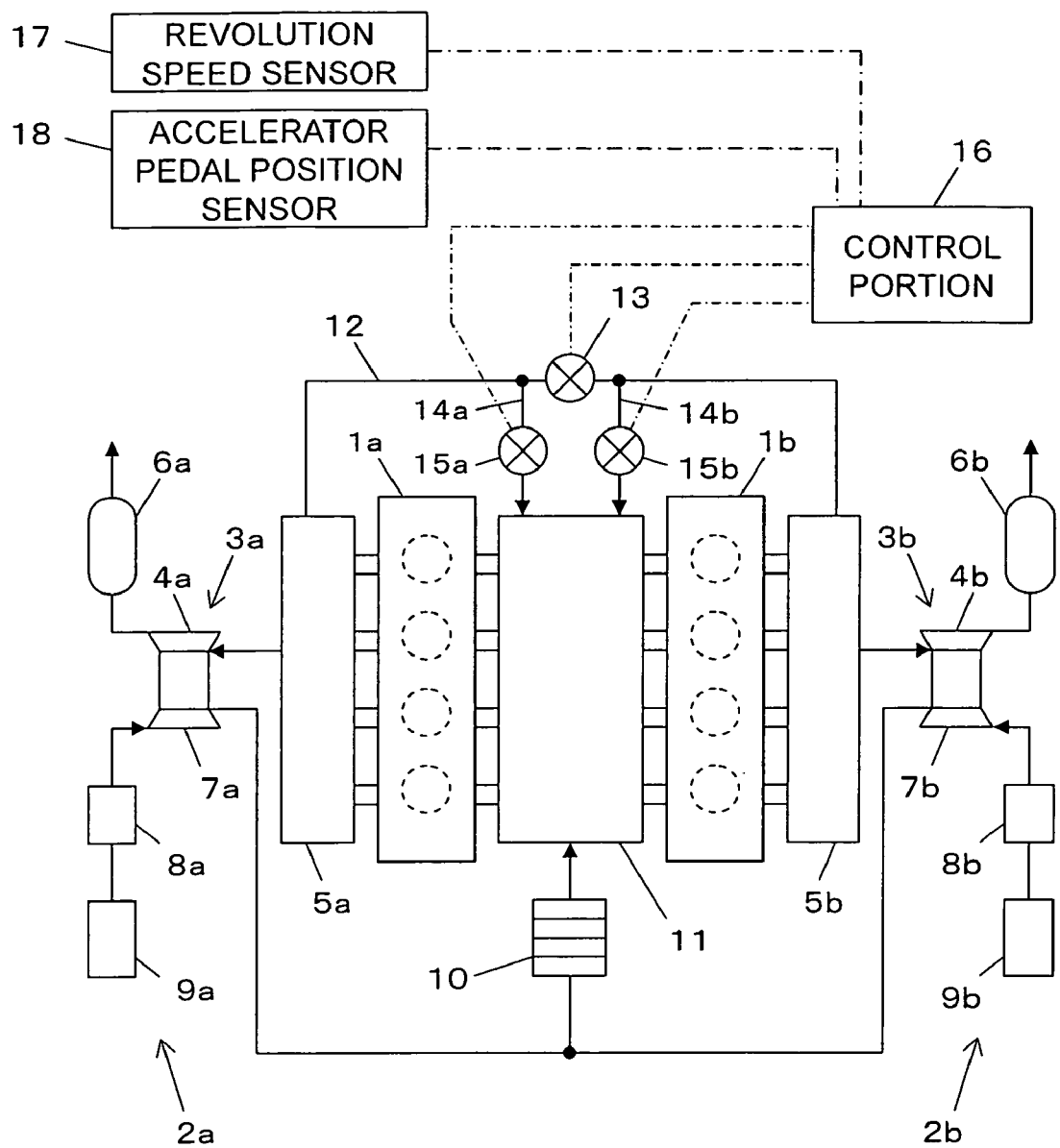
FIG. 1 is a diagram showing an overall construction of an intake and exhaust device for a multi-cylinder engine according to a first embodiment of the present invention.

FIG. 1 shows an overall construction of an intake and exhaust device for a multi-cylinder engine according to a first embodiment of the present invention. In a V-8 cylinder engine, to which the first embodiment is applied, eight cylinders are divided into two groups of four cylinders. The cylinders in one of the groups are arranged in a left bank 1a, and those in the other group are arranged in a right bank 1b. Two intake and exhaust systems 2a and 2b are disposed corresponding to the left and right banks 1a and 1b respectively.

The intake and exhaust system 2a corresponding to the left bank 1a is provided with a turbocharger 3a. An exhaust manifold 5a is connected to an inlet port of a turbine 4a of the turbocharger 3a, and a diesel particulate filter (DPF) 6a is connected to an outlet port of the turbine 4a. An air cleaner 9a is connected to a suction port of a compressor 7a of the turbocharger 3a via an airflow meter 8a, and an intake manifold 11, which is common to both the intake and exhaust systems 2a and 2b, is connected to a discharge port of the compressor 7a via an intercooler 10.

Similarly, the intake and exhaust system 2b corresponding to the right bank 1b is provided with a turbocharger 3b. An exhaust manifold 5b is connected to an inlet port of a turbine 4b of the turbocharger 3b, and a DPF 6b is connected to an outlet port of the turbine 4b. An air cleaner 9b is connected to a suction port of a compressor 7b of the turbocharger 3b via an airflow meter 8b, and the intake manifold 11 is connected to a discharge port of the compressor 7b via the intercooler 10.

The exhaust manifold 5a for the left bank 1a and the exhaust manifold 5b for the right bank 1b communicate with each other through a communication passage 12. An adjusting valve 13 for opening and closing the communication passage 12 is disposed in the communication passage 12.

An EGR introduction passage 14a for the intake and exhaust system 2a and an EGR introduction passage 14b for the intake and exhaust system 2b are formed. The EGR introduction passage 14a branches off from the communication passage 12 at a position between the exhaust manifold 5a for the left bank 1a and the adjusting valve 13, and leads to the intake manifold 11. The EGR introduction passage 14b branches off from the communication passage 12 at a position between the exhaust manifold 5b for the right bank 1b and the adjusting valve 13, and leads to the intake manifold 11. In other words, the two EGR introduction passages 14a and 14b are disposed on opposite sides with respect to the adjusting valve 13. EGR valves 15a and 15b are disposed in the EGR introduction passages 14a and 14b respectively.

A control portion 16, which controls the opening and closing of the adjusting valve 13 and the EGR valves 15a and 15b, is connected thereto. Moreover, various sensors including a revolution speed sensor 17 for detecting an engine revolution speed and an accelerator pedal position sensor 18 for detecting a position of an accelerator pedal are connected to the control portion 16. Detection signals indicating operating conditions of the engine such as an engine revolution speed and a position of the accelerator pedal are inputted to the control portion 16 from those sensors. A fuel injection amount is determined on the basis of the detected position of the accelerator pedal.

The control portion 16 can control a state of communication/shutoff between the exhaust manifolds 5a and 5b of both the intake and exhaust systems 2a and 2b and an on/off state of EGR for the intake and exhaust systems 2a and 2b independently of each other, by opening and closing the adjusting valve 13 and the two EGR valves 15a and 15b.

Although not shown, an intake throttle, an EGR cooler, a bypass passage for the EGR cooler, a switching valve installed in the bypass passage, and the like are also provided in addition to the aforementioned construction.

Next, an operation of the first embodiment will be described.

Exhaust gas discharged from the respective cylinders in the left bank 1a causes the turbine 4a of the turbocharger 3a to rotate and then is delivered to the DPF 6a. The compressor 7a of the turbocharger 3a is thereby driven, so that air, which has been taken in via the air cleaner 9a and the airflow meter 8a, is compressed by the compressor 7a and then delivered to the intake manifold 11 via the intercooler 10.

Similarly, exhaust gas discharged from the respective cylinders in the right bank 1b causes the turbine 4b of the turbocharger 3b to rotate and then is delivered to the DPF 6b. The compressor 7b of the turbocharger 3b is thereby driven, so that air, which has been taken in via the air cleaner 9b and the airflow meter 8b, is compressed by the compressor 7b and then delivered to the intake manifold 11 via the intercooler 10.

Figure 2:
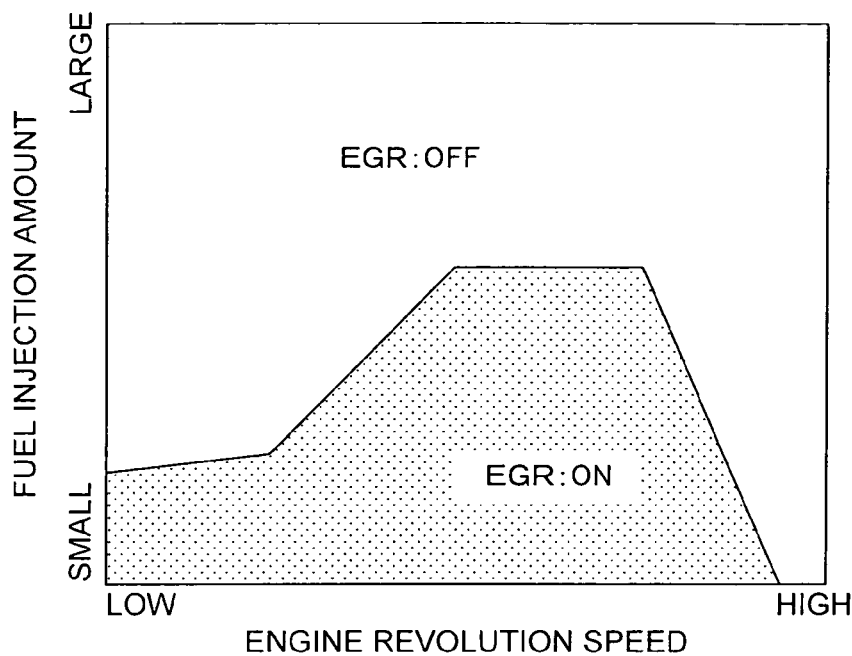
FIG. 2 is a map used in the first embodiment and showing an EGR-on range and an EGR-off range.

At this moment, the control portion 16 determines an on/off state of EGR according to a preset map as shown in FIG. 2, based on operating conditions such as an engine revolution speed and a position of the accelerator pedal, which have been detected by the revolution speed sensor 17 and the accelerator pedal position sensor 18 respectively. Furthermore in an EGR-on range, the control portion 16 calculates an optimal EGR rate for each of the intake and exhaust system 2a on the side of the left bank 1a and the intake and exhaust system 2b on the side of the right bank 1b according to operating conditions of the engine, and adjusts opening degrees of the EGR valves 15a and 15b such that the calculated EGR rates are achieved. Thus, part of exhaust gas taken out from the exhaust manifold 5a on the side of the left bank 1a and part of exhaust gas taken out from the exhaust manifold 5b on the side of the right bank 1b are caused to recirculate to the intake manifold 11.

Figure 3:
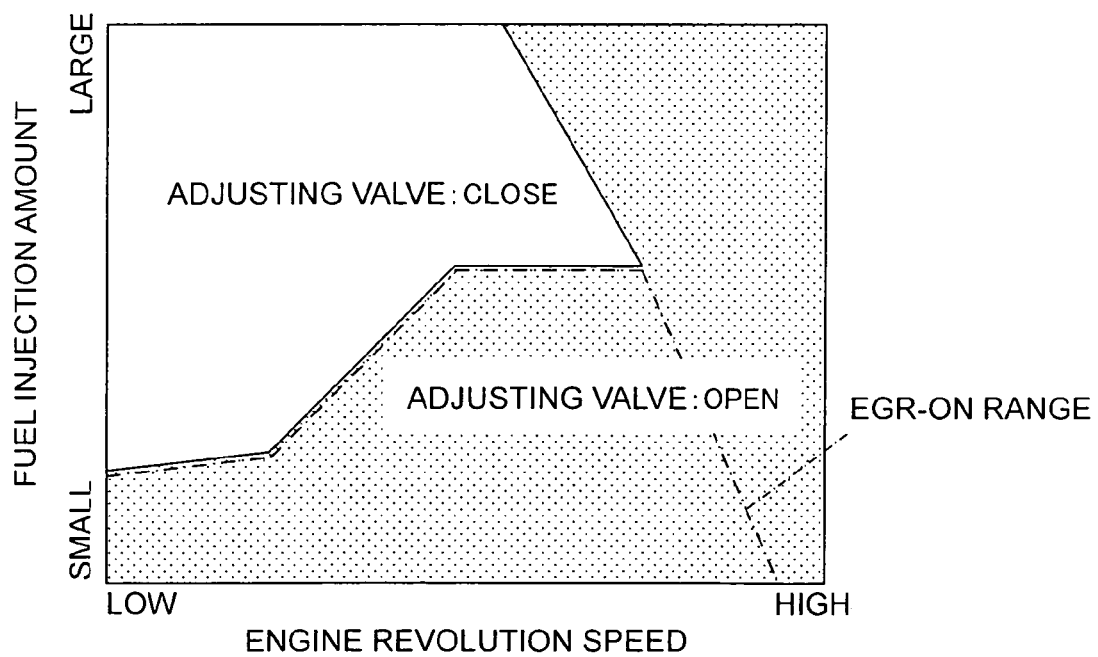
FIG. 3 is a map used in the first embodiment and showing an open range and a closed range of an adjusting valve.

The control portion 16 also controls the opening and closing of the adjusting valve 13 according to a preset map as shown in FIG. 3. In this case, the adjusting valve 13 is closed in a low-to-medium-revolution EGR-off range. Thus, gas flow between the exhaust manifold 5a for the left bank 1a and the exhaust manifold 5b for the right bank 1b is shut off. As a result, internal pressures of the exhaust manifolds 5a and 5b rise, which leads to enhancement of supercharging pressures of the turbochargers and thus to enhancement of an output.

In the EGR-on range, on the other hand, the adjusting valve 13 is opened. Thus, the exhaust manifold 5a for the left bank 1a and the exhaust manifold 5b for the right bank 1b communicate with each other, and exhaust gases in both the exhaust manifolds mix with each other. Therefore, EGR distribution in the left bank 1a and the right bank 1b becomes favorable, and a difference between the EGR rate of the intake and exhaust system 2a on the side of the left bank 1a and the EGR rate of the intake and exhaust system 2b on the side of the right bank 1b is decreased. Thus, the amount of NOx can be reduced by carrying out EGR favorably while holding an output drop at its minimum.

The adjusting valve 13 is opened also in a high-load high-revolution EGR-off range, and the exhaust manifold 5a for the left bank 1a and the exhaust manifold 5b for the right bank 1b communicate with each other. A difference Do in revolution speed between the left and right turbochargers 3a and 3b at the time when the adjusting valve 13 is opened to establish communication between the left and right exhaust manifolds 5a and 5b is smaller than a difference Dc in revolution speed between the left and right turbochargers 3a and 3b at the time when the adjusting valve 13 is closed to shut off gas flow between the left and right exhaust manifolds 5a and 5b. This is because the internal pressures of the left and right exhaust manifolds 5a and 5b have been balanced by opening the adjusting valve 13. This makes it possible to raise revolution speeds of both the turbochargers 3a and 3b to their maximums and thus to achieve enhancement of an output.

As described hitherto, it is possible to sufficiently enhance an output not only in a low-to-medium-revolution range but also in a high-load high-revolution range.

As shown in FIG. 3, as is the case with the high-load high-revolution range, the adjusting valve 13 is opened to establish communication between the left and right exhaust manifolds 5a and 5b also in a low-load high-revolution range. In general, however, since there is no great need to further enhance an output in this range, the adjusting valve 13 may also be closed to shut off gas flow between the left and right exhaust manifolds 5a and 5b in the low-load high-revolution range.

Although the adjusting valve 13 may fully open and close the communication passage 12, it is also possible to use a valve whose opening degree is adjustable so that a degree of communication between the exhaust manifold 5a for the left bank 1a and the exhaust manifold 5b for the right bank 1b can be adjusted.

Second Embodiment

Figure 4:
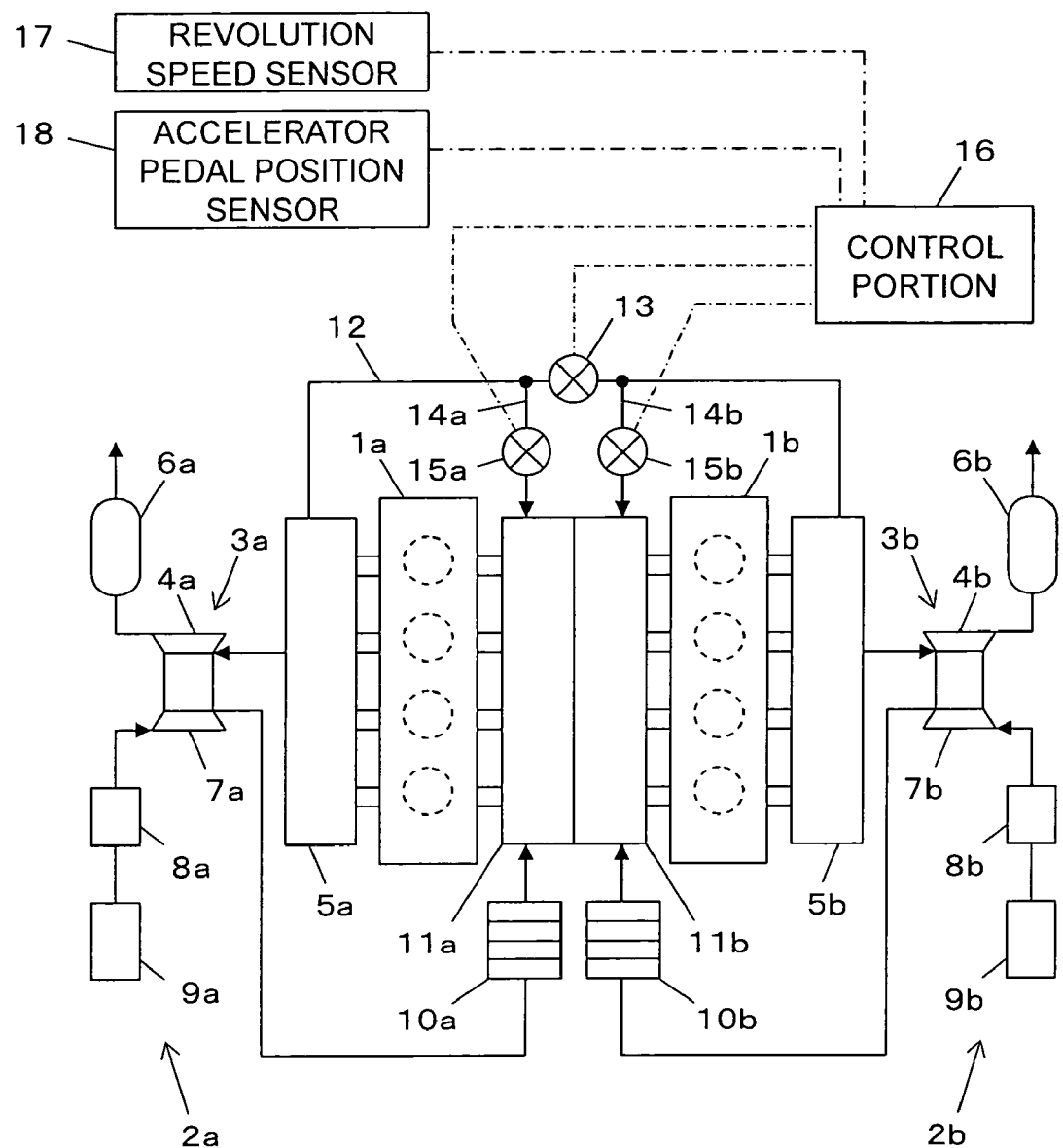
FIG. 4 is a diagram showing an overall construction of an intake and exhaust device for a multi-cylinder engine according to a second embodiment of the present invention.

FIG. 4 shows an overall construction of an intake and exhaust device for a multi-cylinder engine according to a second embodiment of the present invention. In the second embodiment, instead of the intake manifold 11 and the intercooler 10 that are common to the left bank 1a and the right bank 1b in the device of the first embodiment shown in FIG. 1, an intake manifold 11a and an intercooler 10a on the side of the left bank 1a and an intake manifold 11b and an intercooler 10b on the side of the right bank 1b are disposed independently of each other.

Air compressed by the compressor 7a of the turbocharger 3a on the side of the left bank 1a is supplied to the intake manifold 11a via the intercooler 10a and then delivered to the respective cylinders in the left bank 1a. On the other hand, air compressed by the compressor 7b of the turbocharger 3b on the side of the right bank 1b is supplied to the intake manifold 11b via the intercooler 10b and then delivered to the respective cylinders in the right bank 1b.

When EGR is on, part of exhaust gas taken out from the exhaust manifold 5a on the side of the left bank 1a is caused to recirculate to the intake manifold 11a via the EGR valve 15a. On the other hand, part of exhaust gas taken out from the exhaust manifold 5b on the side of the right bank 1b is caused to recirculate to the intake manifold 11b via the EGR valve 15b.

In this construction as well, as is the case with the aforementioned first embodiment, it is possible to sufficiently enhance an output in the low-to-medium-revolution range and in the high-load high-revolution range, to decrease a difference in EGR rate between the left and right intake and exhaust systems 2a and 2b, and to achieve a reduction in amount of NOx while holding an output drop at its minimum.

Third Embodiment

Figure 5:
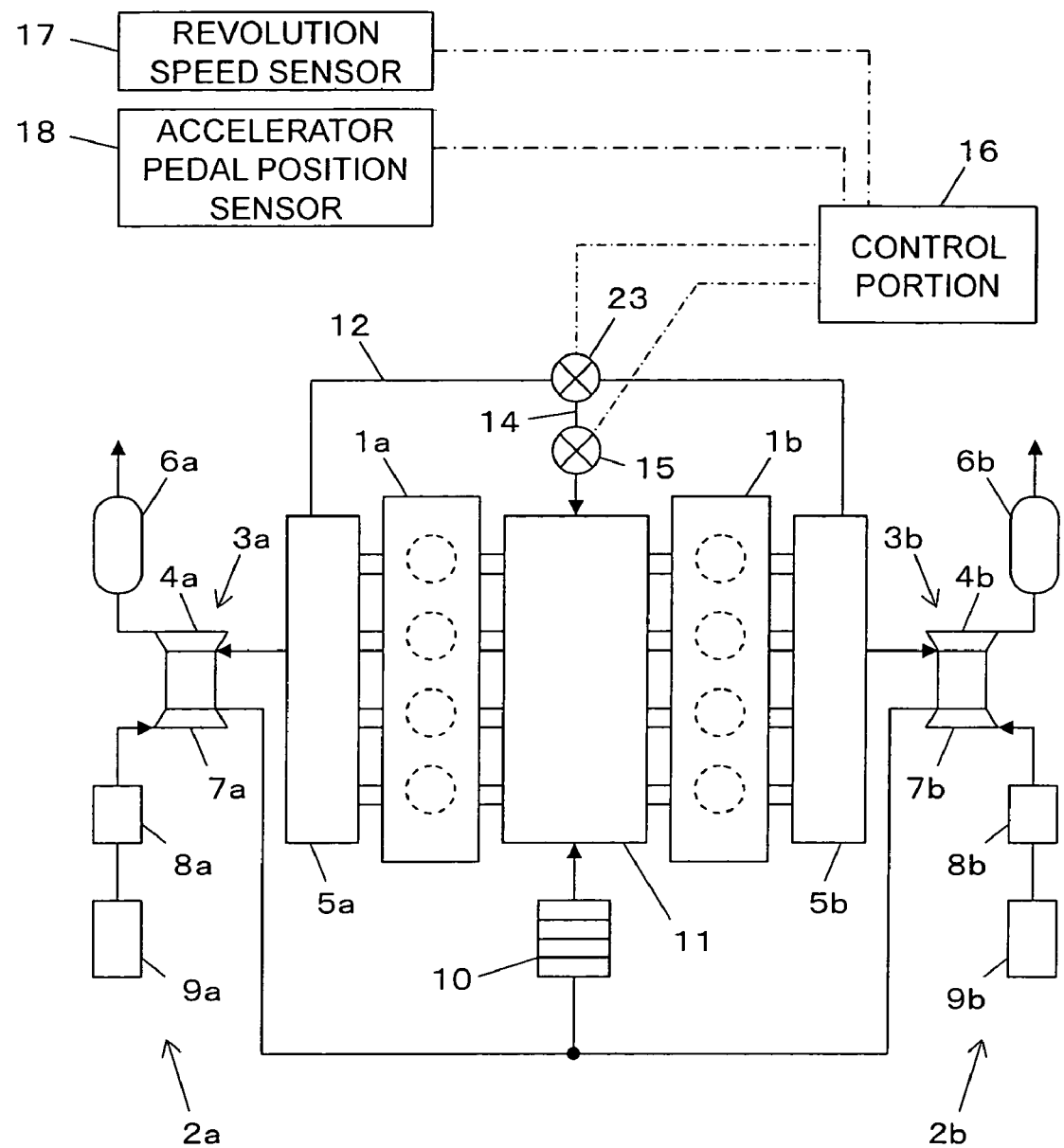
FIG. 5 is a diagram showing an overall construction of an intake and exhaust device for a multi-cylinder engine according to a third embodiment of the present invention.

FIG. 5 shows an overall construction of an intake and exhaust device for a multi-cylinder engine according to a third embodiment of the present invention. The third embodiment is obtained by modifying the device of the first embodiment shown in FIG. 1 such that the intake manifold 11 is coupled to the communication passage 12 via an EGR introduction passage 14 common to the left bank 1a and the right bank 1b, that an adjusting valve 23 is disposed in a coupling portion between the communication passage 12 and the EGR introduction passage 14, and that an EGR valve 15 is disposed in the EGR introduction passage 14. When the adjusting valve 23 is opened, the exhaust manifold 5a for the left bank 1a and the exhaust manifold 5b for the right bank 1b communicate with each other via the communication passage 12, which communicates with the EGR introduction passage 14. On the other hand, when the adjusting valve 23 is closed, gas flow between the exhaust manifold 5a for the left bank 1a and the exhaust manifold 5b for the right bank 1b is shut off, and the EGR introduction passage 14 is also closed regardless of whether the EGR valve 15 is open or closed.

The control portion 16 closes the adjusting valve 23 in the low-to-medium-revolution EGR-off range according to a preset map as shown in FIG. 3. Thus, gas flow between the exhaust manifold 5a for the left bank 1a and the exhaust manifold 5b for the right bank 1b is shut off. As a result, internal pressures of the exhaust manifolds 5a and 5b rise, which leads to enhancement of supercharging pressures of the turbochargers.

In the EGR-on range, on the other hand, the control portion 16 opens the adjusting valve 23. As a result, the exhaust manifold 5a for the left bank 1a and the exhaust manifold 5b for the right bank 1b communicate with each other, and the communication passage 12 and the EGR introduction passage 14 communicate with each other. In this case, the control portion 16 calculates optimal EGR rates for both the intake and exhaust systems 2a and 2b according to operating conditions of the engine, and adjusts an opening degree of the EGR valve 15 such that the calculated EGR rates are achieved. Thus, exhaust gases in both the systems 2a and 2b mix with each other, which makes it possible to carry out EGR favorably while suppressing an output drop, and to reduce an amount of NOx.

In the high-load high-revolution EGR-off range, the control portion 16 opens the adjusting valve 23 and the exhaust manifold 5a for the left bank 1a and the exhaust manifold 5b for the right bank 1b communicate with each other, but the EGR valve 15 is closed. Thus, internal pressures of the left and right exhaust manifolds 5a and 5b are balanced, which makes it possible to enhance an output.

Thus, in the third embodiment as well, as is the case with the aforementioned first and second embodiments, it is possible to sufficiently enhance an output in the low-to-medium-revolution range and in the high-load high-revolution range, and to reduce an amount of NOx while holding an output drop at its minimum.

In the first to third embodiments, it is not absolutely necessary to install the DPF 6a or 6b in each of the intake and exhaust systems. It is also possible to dispense with the DPF or to dispose a catalyst instead of the DPF.

It is not absolutely required that the adjusting valve and the EGR valve be electrically opened and closed by the control portion 16. For instance, a valve that is opened and closed through introduction of a pressure in an exhaust passage or an intake passage may be used.

As a method of controlling the adjusting valve, it is also adoptable to establish communication between the exhaust manifold for the left bank and the exhaust manifold for the right bank by opening the adjusting valve when EGR is on, or when the engine revolution speed is equal to or higher than a predetermined value (e.g., 2000 rpm), and to shutoff gas flow between the exhaust manifold for the left bank and the exhaust manifold for the right bank by closing the adjusting valve when EGR is off and the engine revolution speed is lower than the predetermined value (e.g., 2000 rpm).

Although the intake and exhaust device applied to the V-8 cylinder engine has been described in each of the aforementioned first to third embodiments, the present invention should not be limited thereto. The present invention is widely applicable to an engine having two intake and exhaust systems, for example, a V-type multi-cylinder engine other than a V-8 cylinder engine, a non-V-type engine such as a horizontally-opposed engine or an inline engine, or the like.

According to the present invention, it is possible to sufficiently enhance an output in all ranges including a high-load high-revolution range.

What is claimed is:

1. An intake and exhaust device for a multi-cylinder engine having a first cylinder group and a second cylinder group, comprising:
   a first intake and exhaust system corresponding to the first cylinder group and having an exhaust passage and an intake passage;
   a second intake and exhaust system corresponding to the second cylinder group and having an exhaust passage and an intake passage;
   a communication passage through which the exhaust passage of the first intake and exhaust system and the exhaust passage of the second intake and exhaust system communicate with each other;

an adjusting valve disposed in the communication passage and for being opened to establish communication between the exhaust passage of the first intake and exhaust system and the exhaust passage of the second intake and exhaust system and being closed to shut off gas flow between the exhaust passage of the first intake and exhaust system and the exhaust passage of the second intake and exhaust system;

EGR means for causing exhaust gas to circulate between the exhaust passage and the intake passage of the first intake and exhaust system and between the exhaust passage and the intake passage of the second intake and exhaust system respectively; and control means for controlling opening and closing of the adjusting valve and circulation of exhaust gas by the EGR means based on an operating condition of the engine.

2. An intake and exhaust device according to claim 1, wherein the EGR means includes:

a first EGR introduction passage through which the exhaust passage and the intake passage of the first intake and exhaust system communicate with each other;

a second EGR introduction passage through which the exhaust passage and the intake passage of the second intake and exhaust system communicate with each other;

a first EGR valve for opening and closing the first EGR introduction passage; and a second EGR valve for opening and closing the second EGR introduction passage, the control means controlling opening degrees of the first EGR valve and the second EGR valve.

3. An intake and exhaust device according to claim 1, wherein the EGR means includes:

an EGR introduction passage through which the communication passage communicates with the intake passage of the first intake and exhaust system and the intake passage of the second intake and exhaust system; and an EGR valve for opening and closing the EGR introduction passage, the control means controlling an opening and closing of the EGR valve.

4. An intake and exhaust device according to claim 1, wherein the intake passage of the first intake and exhaust system and the intake passage of the second intake and exhaust system communicate with each other.

5. An intake and exhaust device according to claim 1, wherein the intake passage of the first intake and exhaust system and the intake passage of the second intake and exhaust system are independent from each other.

6. An intake and exhaust device according to claim 1, wherein the control means includes:

an operating condition sensor that detects an operating condition of the engine; and a control portion that controls opening and closing of the adjusting valve and circulation of the exhaust gas by the EGR means based on a detection signal from the operating condition sensor.

7. An intake and exhaust device according to claim 6, wherein the control portion opens the adjusting valve in an EGR-on range and in a high-load high-revolution EGR-off range, and the control portion closes the adjusting valve in a low-to-medium revolution EGR-off range.

8. An intake and exhaust device according to claim 6, wherein the operating condition sensor includes:

a revolution speed sensor that detects a revolution speed of the engine; and an accelerator pedal position sensor for detecting a position of an accelerator pedal.

9. An intake and exhaust device according to claim 1, wherein each of the first intake and exhaust system and the second intake and exhaust system has a turbocharger.

10. An intake and exhaust device according to claim 4, further comprising a common intercooler connected to the intake passage of the first intake and exhaust system and the intake passage of the second intake and exhaust system.

11. An intake and exhaust device according to claim 5, further comprising a first intercooler connected to the intake passage of the first intake and exhaust system, and a second intercooler connected to the intake passage of the second intake and exhaust system.

* * * * *